Sept. 5, 1950     W. LEATHERS ET AL     2,521,379
GYRO CAGING DEVICE
Filed Dec. 29, 1945
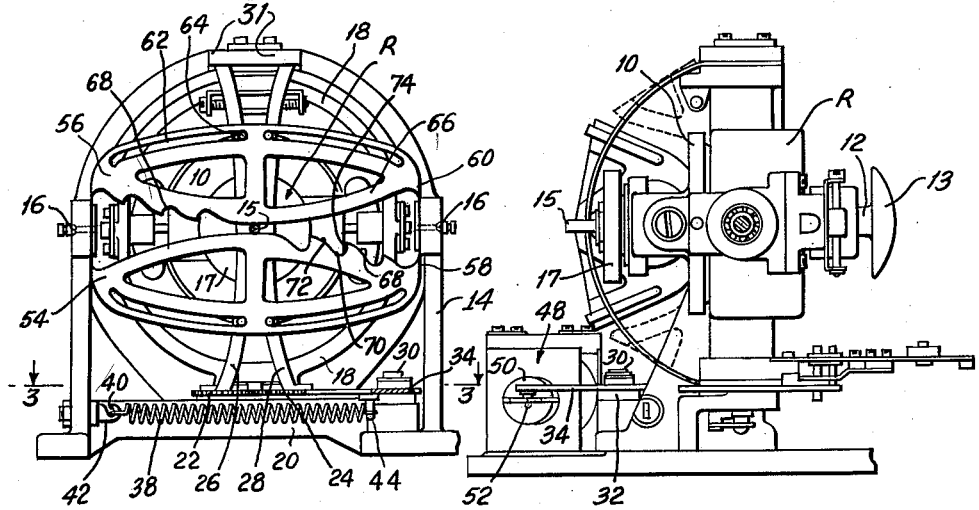
INVENTORS
WARD LEATHERS
GEORGE S. DiMONICO
BY
*W. M. Wilson*
ATTORNEY Patented Sept. 5, 1950

2,521,379

UNITED STATES PATENT OFFICE 2,521,379

GYRO CAGING DEVICE

Ward Leathers and George S. Di Monico, Brooklyn, N. Y., assignors to International Business Machines Corporation, New York, N. Y., a corporation of New York Application December 29, 1945, Serial No. 638,396

8 Claims. (Cl. 74—5.1)

The present invention relates to improvements in caging devices for gyroscopes whether the same are employed in connection with gyro indicating instruments or for gyro control purposes. When gyroscopes are used on movable objects, such as airplanes, tanks, sea-going vessels and the like, as basic positioning or reference orienting devices, it is occasionally desirable to bring the axis of the gyro rotor into alignment with an axis of the vehicle or an axis of the gyro casing itself. This operation is commonly referred to as caging. This may be desirable immediately previous to violent maneuvers to protect the gyro, inasmuch as unusual maneuvering of the vehicle may cause a portion or portions of the rotor supporting mechanism to strike the stops and damage the instrument. Also, it may be desirable from time to time, due to drift of the rotor axis, to bring the same quickly to a predetermined or correct position. In addition to this, it is desirable to lock the gyro cage during shipping of the instrument to prevent damage to the instrument during handling.

The caging device comprising the present invention is suitable for caging a gyro with respect to two axes at right angles to each other and the invention is described as being applied to either a traverse control or an elevational control gyroscope of the type shown and described in a copending application, Serial No. 638,394, filed December 29, 1945, for Stabilized Gun Control Mechanism.

In carrying out the principles of the present invention, a pair of caging jaws of arcuate design and somewhat greater in radius than the radius of the gyro gimbal rings are pivoted at their ends about respective axes each of which is parallel to one tilting axis of the gyroscope rotor and are adapted to be swung from remote or extended positions to a central position wherein they engage a projecting portion of the gyro spindle to center the same about one axis. A similar pair of caging jaws operate at right angles to the first mentioned jaws and, when brought to their closed positions, operate to center the gyro spindle about the other axis.

The principal object of the present invention is to provide a caging mechanism of the type briefly outlined above wherein there is provided on the opposite jaws of at least one pair thereof an abutment or a fragmentary series of abutments designed to arrest the normal precession of the gyro that would ordinarily occur in the absence of such abutments during caging operations.

In explanation of the above object, it is pointed out that with a caging mechanism of the type outlined above engagement of any one caging jaw of the two pairs of jaws with the end of the rotor spindle will immediately cause precession of the gyro at right angles to the applied force. The resulting angular movement of the gyro spindle causes the same to travel rapidly along the edge of the jaw until such time as it encounters an oncoming jaw associated with the other pair of jaws. As such time, a new precessional direction will be applied to the spindle and the same will travel along an edge of the latter jaw until the opposite jaw of the first pair thereof is encountered, at which time further precessional movement at right angles will take place. The net result of closing of the jaws, therefore, is to cause the end of the gyro spindle to progress toward a center position by performing a series of angular movements or sweeps of progressively decreasing extent until such time as both sets of jaws become completely closed. If, at the outset, the displacement of the gyro axis is relatively great, the end of the gyro spindle may have to make three or four of these involute rectangular diminishing cycles before the same can be brought to its caged or centered position. The present invention is designed to very materially shorten the path of travel of the end of the gyro spindle in moving from a displaced position to its center or caged position.

In carrying out the above mentioned object, there are provided along the opposite jaws of each pair of jaws a series of abutments which, by virtue of their particular contour, in effect provide therebetween a series of notches or depressions into which the end of the gyro spindle or of a gyro caging pin carried by the gyro stator and in alignment with the spindle may selectively ride or be drawn during caging operations, depending upon which abutment happens to be encountered due to the particular extent of the displacement of the gyro axis at the commencement of caging operations.

Inasmuch as it is inherent in the nature of a gyroscopic rotor to precess according to the well-known and convenient "hand rule" wherein, using either hand, if the fingers surround the rotor axis in the direction of rotation and the index finger points in the direction of the applied force the thumb will then extend in the direction of precession, it is unnecessary to space these abutments or notches formed thereby coextensively along each jaw.

If, for example, the rotor is turning in a counter-clockwise direction, as viewed from the front of the casing, and the caging pin first engages the upper and downwardly moving jaw element, precession will take place causing this end of the caging rotor to travel to the left. If initially the caging pin is to the right of its center position, it should be allowed a free path of movement along the jaw to its center position. If, however, the pin is initially to the right of its center position further travel of the same along the jaw to the right would cause it to move still further away from its center position. Similarly, if the pin first engages the lower upwardly moving jaw, the tendency of the pin and consequently the end of the spindle will be to travel to the right. If initially this pin is to the left of the center, it should be allowed a free path of travel toward its center position, but if initially it is to the right of the center additional movement of the same in this direction would carry the same still further away from its center position. According to the present invention, to obviate this unnecessary travel of the caging pin during caging operations, obstructions are provided on the upper jaw at the left of the center thereof and on the lower jaw at the right of the center thereof. In this manner, if the pin, during caging, happens to encounter either jaw on the smooth side thereof, the same will immediately precess toward the center of the jaw. If, however, it happens to encounter the jaw in the vicinity of one of the notches on the other side of the jaw, further movement of the pin away from the center will be prevented and the same will be held substantially stationary until it encounters one or the other of the oncoming vertically disposed laterally moving caging jaws. These latter vertically disposed caging jaws are smooth throughout their entire width, inasmuch as it has been found that if the abutments are placed on the horizontally disposed jaws a very rapid caging operation in any event will occur. It is, however, within the purview of the present invention to provide abutments on the vertically disposed jaws if desired, although the amount of lost motion eliminated is small providing the other pair of jaws is suitably equipped with arresting abutments. Obviously, it is within the scope of the invention to place the arresting jaws exclusively on the vertically disposed caging members, eliminating them from the horizontal disposed members.

Another object of the present invention is to provide a gyro caging device of the general character set forth above including vertically disposed, horizontally moving and horizontally disposed, vertically moving jaws wherein positive driving action is applied to one pair of jaws only and a suitable pin and slot interlinkage connection is made between the two pairs of jaws whereby the other pair thereof will follow the closing movements of the first driving pair and thus itself become closed during caging operations.

A still further object of the present invention is to provide a gyro caging mechanism of this type wherein the caging jaws are electromagnetically controlled for opening purposes and wherein they are normally maintained closed by a spring action so that when the gyro is deenergized the same will at all times remain caged.

In order to prevent opening of the caging jaws immediately upon energization of the gyro and prior to the attainment of the full rotational speed of the rotor, a time delay factor has been introduced into the magnet circuit so that automatic opening of the jaws will not take place until the gyro has attained sufficient speed to enable the same to maintain a celestial or axial direction in space. This latter feature constitutes the fulfillment of yet another object of the invention.

With these and many other objects in view, which will become more readily apparent as the nature of the invention is better understood, the same consists in the novel construction, combination and arrangement of parts shown in the accompanying drawings.

In the drawings:

Fig. 1 is a front elevational view of a gyroscope to which the improved caging device comprising the present invention has been applied and with the gyro casing removed.

Fig. 2 is a side elevational view of the showing of Fig. 1.

Fig. 3 is a sectional view taken substantially along the line 3—3 of Fig. 1.

Fig. 4 is an electric circuit diagram illustrating a time delay action employed in connection with the present invention.

In all of the above described views like characters of reference are employed to designate like parts throughout.

Referring now to the drawings in detail, and in particular to Figs. 1 and 2, the gyro rotor is designated at R and is provided with a stator having a frame 10. The rotor spindle 12 extends forwardly in the gyro casing (not shown) and has mounted thereon one element 13 of a magnetic gyro leveling device which constitutes the subject matter of a copending application and for which no claim is made herein. Inasmuch as the present invention has been illustrated herein in connection with a gyroscope of the type utilized for controlling the movements of a tank turret in traverse, as illustrated in the above mentioned co-pending application, Serial No. 638,394, the axis of the spindle 12 is adapted to be normally maintained horizontal, as represented in Figs. 1 and 2.

A gyro frame in the form of an inverted U-shaped member 14 is secured in any suitable manner to the casing and supports a pair of bearings or trunnions 16 for a gimbal ring 18. The frame 14 is provided with a cross piece or base 20 (see also Fig. 3) on which there is disposed on each side of a vertical center line a pair of intermeshing gears 22 and 24, to which there are secured the lower ends of a pair of caging jaws including jaw elements 26 and 28 respectively. Each of the jaws is in the form of an arcuate bow which normally projects rearwardly of the gyroscope and the upper ends of which are pivoted as at 31 at spaced points in the upper regions of the frame 14. The caging bows 26 and 28 normally straddle one end of a caging pin 15 which projects rearwardly from the stator frame 10 and the radii of the gears 22 and 24 and the distance between the pivotal points 31 are sufficiently great that when the caging jaws are in their normal caging positions in engagement with the pin 15 the sides of the jaws diverge upwardly and downwardly, as viewed in Fig. 1, above and below the pin 15. A balancing wheel is shown at 17.

The base portion 20 of the frame 14 is provided with an extension 32 (Fig. 3) on which there is pivoted an operating link 34 having a toothed sector portion 36 designed for meshing engagement with the teeth provided on one or the other of the gears 22 and 24, and preferably the latter.

The jaws 26 and 28 are normally maintained centered and closed upon the pin 15 by means of a coil spring 38, one end of which is anchored as at 40 to a lug 42 secured to the side of the frame 14 and the other end of which is anchored as at 44 to the operating link 34 inwardly of its pivotal point 30. In this manner, the link 34 is normally urged in a counterclockwise direction, as viewed in Fig. 3, and the two gears 22 and 24 remain under the application of torque tending to close the jaws.

The jaw members 26 and 28 are capable of being swung about their respective vertical pivotal axes to a retracted position wherein they extend outwardly in opposite directions and substantially in alignment, as fragmentarily shown in Fig. 3, suitable limit stops being provided to determine the retracted positions thereof. The jaws are electromagnetically controlled and, toward this end, an electromagnet 48 is provided with a movable core 50 to which the rear end of the link 34 is pivotally connected as at 52. The magnet 48 normally remains deenergized when the gyroscope is not in use but upon energization of the gyroscope the core 50 of the magnet 48 is adapted to be attracted and moved in such a direction as to swing the link 34 in a clockwise direction, as viewed in Fig. 3, thus opening the jaws 26 and 28.

From the above description it will be seen that the pair of jaws 26, 28 operate upon the pin 15 to maintain the axis of the rotor R centered with respect to a horizontal axis. If after the gyroscope has been in operation and the axis of the rotor R has deviated from its normal or center position to one side or the other of a vertical center line, and one or the other of the jaws 26, 28 during caging operations engages the pin, a force will be applied to the pin which, if the gyroscope were not rotating in actual operation, would immediately move the pin in the direction of the applied force toward its center position. In actual practice, however, during operation of the gyroscope, such is not the case due to the phenomenon of precession wherein the axis of the spinning rotor resists any attempt to force the same in one direction and instead readily moves at right angles to the direction of the applied force. Because of this phenomenon of precession, when the pin 15 engages one or the other of the inwardly closing jaws 26 or 28, the tendency will be for the pin, instead of immediately moving toward its center position, to creep along the inner edge of the contacting jaw. If the axis of the spindle 12 be inclined so that the pin 15 is at the left of the center position, as viewed in Fig. 1, and engagement is made with the inner surface of the closing jaw member 26, the tendency for the pin will be to creep upwardly along the smooth inner surface of the jaw. If the pin is below the horizontal, it will move upwardly toward its center position, through the center position and away therefrom. If the pin is above the center position it will move still further away from the center. A similar condition obtains in connection with the right-hand jaw 28. It will be seen from the above discussion, therefore, that although the two jaws 26 and 28 move inwardly and close upon each other, their function, except when the gyro is at rest, is not to urge the pin laterally to a medial position but to cause precession of the gyro in such a direction as to cause the pin to move vertically and find a center position.

In order to cause precession of the gyro in such a manner as to impart to the pin a lateral component of motion, a pair of substantially horizontally disposed arcuate caging bow members 54 and 56 are pivoted as at 58 and 60 to spaced points on the sides of the frame 14 for swinging movement about respective horizontal axes. These jaw members are independently pivoted and derive their motion directly from the motion of the vertically extending jaw members 26 and 28. Toward this end, the jaw members 54 and 56 are each provided with a pair of slots 62 therein through which there projects respective guide pins 64 formed on the outer sides of the jaw members 26 and 28. The confines of the arcuate slots 62 do not extend in a horizontal plane but rather they are inclined, i. e., when the jaw portions 66 thereof are closed upon the pin 15 they extend laterally outwardly and downwardly and outwardly and upwardly respectively. In this manner, when the pins 64 swing outwardly during opening of the jaw elements 26 and 28 in a horizontal plane, these pins engage the edges of the slots 62 and cause the jaw members 54 and 56 to be swung open to their limiting positions adjacent the top and the bottom of the gyroscope casing.

If the inner edges of the jaw members 54 and 56 presented a continuous smooth surface, the pin 15 upon engagement with either of these surfaces would, by virtue of the phenomenon of precession, as outlined above, traverse a major portion of the length of these jaw members, particularly if displacement of the rotor axis were very great at the commencement of caging operations. Such traversing of this end of the gyro would, in many instances, depending upon the angular position of the gyroscopic axis at the commencement of caging operations, overrun the center position of the spindle. With four caging bows disposed in the manner described above and shown in the accompanying drawings, the net result of successive engagement of the rear end of the gyro with the inner surface of the centering jaws would be to cause the pin to execute a series of involute lateral movements passing around the center position three or four or more times until eventually precession and intermittent shifting of the path of the pin would bring the same to its center position.

In order to obviate the major portion of the lost motion ordinarily encountered in gyro caging devices of the type outlined above, a series of spaced protuberances 68, of which three have been shown in the drawings, are formed on the inner surface of each of the caging members 54 and 56. One series of such protuberances is formed on the inner surface of the bow 54 at the right of the center line and another such series of protuberances are formed on the inner surface of the bow 56 at the left of the center line. The protuberances 68 on the bows 54 and 56 form therebetween notches or wells 70 having one side 72 thereof provided with a gentle incline and the other side 74 thereof being steeply inclined.

In the operation of the caging device, upon deenergization of the electromagnet 48 and movement of the caging bows inwardly toward their center positions, the pin is encountered by one of the caging bows, the particular bow encountered being dependent upon the displaced position of the spindle axis. If the first bow encountered happens to be one of the vertical bows 26 or 28, precession of the gyro will take place in such a direction as to cause the pin 15 to move either upwardly or downwardly, until such time as one of the oncoming laterally disposed caging bows 54 or 56 is encountered, after which the direction of precession of the gyro takes place at right angles. If, upon initial encountering of either bow 54 or 56, the smooth inner edge thereof is engaged, precession of the gyro, tending to cause the pin to move toward the center position, will take place. If, however, when either the bow 54 or 56 is encountered on the side of the center line wherein are formed the abutments 68 and notches or wells 70 precession away from the center will occur so that the pin 15 will be caught, so to speak, in the first encountered notch or well and held therein until one or the other of the oncoming vertical caging bows 26 or 28 is encountered. At this time a further precession of the gyro will take place tending to move the pin 15 vertically, either up or down, until the smooth edge of the opposing jaw is encountered, after which precession will take place toward the center position.

While any number of abutments 68 and notches 70 may be formed on the inner edges of the caging bows 54 and 56, it has been found that three such abutments and three notches for small gyros of this type will cause an extremely rapid caging of the gyro. Except in extreme cases where the axis of the gyro spindle is widely displaced from the center position, movement of the pin into an adjacent notch followed by almost immediate precession of the gyro to its center position will take place. Rarely will the pin be obliged to encounter all four caging bows before complete caging is attained.

Referring now to Fig. 4 wherein the electrical diagram for the caging mechanism is shown, closure of a main operating switch S serves to conduct current from a source E to the gyro motor M, thus immediately setting the rotor R into operation. Prior to and up until the time of closure of the switch S, the rotor R is maintained centered by virtue of the spring 38. In order to allow ample time for the rotor to attain full speed a time delay feature operates to cause slow energization of the electromagnet 48. The electromagnet 48 is provided with a winding 76, hereinafter referred to as the caging coil. Upon closure of the switch S, current will flow through leads $a$, $b$, $c$, holding resistance R1, leads $d$, $e$, caging coil 76 and lead $f$ to the source. Simultaneously, current will flow through lead $a$, heating resistance R2, leads $g$, $h$, a pair of normally closed contacts 78, leads $i$, $e$, caging coil 76 and lead $f$ to the source. The amount of current passing through the two paths just traced is normally insufficient to cause operative energization of the coil 76 and, as a consequence, the gyro remains caged under the influence of the spring 38. After a predetermined period of time, heat supplied from the heating resistance R2 operates a thermostatically controlled pair of contacts 80 and closes the same, thus allowing current to flow through leads $a$, $b$, contacts 80, leads $k$, $h$, contacts 78, leads $i$, $e$, caging coil 76 and lead $f$ to the source. The path just traced is a direct path through the caging coil 76 and this latter coil thus receiving full line voltage becomes energized, whereupon the caging device immediately becomes open to release the motor in a manner previously described.

In order that the caging coil 76 shall not operate continuously under full line voltage, initial energization thereof serves to open the pair of contacts 78 and the net effect of such opening of the contacts is to effectively remove the contacts 80 and also the heating resistance R2 from the circuit, thus allowing current to flow through leads $a$, $b$, $c$, holding resistance R1, leads $d$ and $e$, caging coil 76 and wire $f$ to the source. A condenser C1 is applied across the contacts 78 to quench any arcing that might occur at this point.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention. For example, while the caging jaws 26 and 28 have been shown as being pivoted about respective axes which are parallel to the vertical axis of the gyroscope and while the caging jaws 54 and 56 have been shown as being pivoted about respective axes which are parallel to the horizontal axis of the gyroscope, it is obvious that the two pairs of jaws may, if desired, be pivoted directly on the vertical and horizontal axes of the gyroscope without affecting the principle of operation of these jaws. It is the intention, therefore, to be limited only as indicated by the scope of the following claims.

What is claimed is:

1. In a gyroscope, a gyro rotor, a member rotatably supporting said rotor for swinging movement about at least two axes other than the rotational axis of the rotor, a caging pin on said member, a pair of caging jaws in the form of arcuate bows partially encompassing said rotor and each being pivoted for swinging movement at their opposite ends about an axis substantially parallel to one of said axes, said jaws being movable from an open position to a closed position wherein they engage said caging pin therebetween to maintain the same in a predetermined fixed position with respect to the other of said axes, a second pair of caging jaws in the form of arcuate bows likewise partially encompassing said rotor and each being pivoted at their ends for swinging movement about an axis substantially parallel to said last mentioned axis and movable from an open position to a closed position wherein they engage the caging pin therebetween to maintain the same in a predetermined fixed position relative to said first mentioned axis, means operatively connecting said pairs of jaws whereby movement of one pair of jaws from its open to its closed position and vice versa will cause corresponding similar movement of said other pair of jaws, spring means normally maintaining one of said pairs of jaws in its closed position, and electromagnetic means operable upon energization thereof to move said latter pair of jaws to its open position.

2. In a gyroscope, a gyro rotor, a member rotatably supporting said rotor for swinging movement about both horizontal and vertical axes, a caging pin on said member, a pair of caging jaws, said jaws each being pivoted for swinging movement about a horizontal axis and movable from an open position to a closed position wherein the jaws engage said caging pin therebetween to maintain the same in a predetermined fixed position relative to said vertical axis, a second pair of caging jaws mounted for swinging movement about a vertical axis and likewise movable from an open position to a closed position wherein they engage the caging pin to maintain the same in a predetermined fixed position relative to said horizontal axis, means operatively connecting each jaw of one pair to a jaw of the other pair whereby said pairs of jaws are caused to close and open simultaneously, spring means normally maintaining said pairs of jaws in their closed position, and electromagnetic means for rendering said spring means inoperative.

3. In a gyroscope, a gyro rotor, a member rotatably supporting said rotor for swinging movement about both horizontal and vertical axes, a caging pin on said member, a pair of caging jaws pivoted for swinging movement about a horizontal axis and movable from an open position to a closed position wherein the jaws engage said caging pin therebetween to maintain the same in a predetermined fixed position relative to said vertical axis, a second pair of caging jaws mounted for swinging movement about a vertical axis and likewise movable from an open position to a closed position wherein they engage the caging pin to maintain the same in a predetermined fixed position relative to said horizontal axis, each of said caging jaws being in the form of an arcuate bow having an inner surface against which said caging pin is adapted to bear when encountered thereby and ride thereupon due to precession of the gyro, a confining abutment formed on the inner edge of each jaw of one pair of jaws and adapted to be engaged by said caging pin during precession of the gyro to prevent undue precession thereof during caging operations, spring means normally maintaining both pairs of jaws in their closed position, and means for rendering said spring means inoperative.

4. In a gyroscope, a gyro rotor, a member rotatably supporting said rotor for swinging movement about both horizontal and vertical axes, a caging pin on said member, a pair of caging jaws pivoted for swinging movement about a horizontal axis and movable from an open position to a closed position wherein the jaws engage said caging pin therebetween to maintain the same in a predetermined fixed position relative to said vertical axis, a second pair of caging jaws mounted for swinging movement about a vertical axis and likewise movable from an open position to a closed position wherein they engage the caging pin to maintain the same in a predetermined fixed position relative to said horizontal axis, each of said caging jaws being in the form of an arcuate bow having an inner surface against which said caging pin is adapted to bear when encountered thereby and ride thereupon due to precession of the gyro, confining abutments formed on the inner opposed edges of one pair of jaws, the confining abutments on one jaw existing on one side of a medial plane passing through said jaws at right angles thereto and the abutments on the other jaw existing on the other side of said plane, spring means normally maintaining both pairs of jaws in their closed position, and means for opening said jaws against the action of said spring means.

5. In a gyroscope, a gyro rotor, a member rotatably supporting said rotor for swinging movement about an axis, a caging pin on said member, a pair of caging jaws pivoted for swinging movement substantially about said axis and movable from an open to a closed position wherein the jaws engage said caging pin therebetween to maintain the same in a predetermined fixed position relative to said axis, each of said caging jaws being in the form of an arcuate bow having an inner surface against which said caging pin is adapted to bear when encountered thereby and ride thereupon due to precession of the gyro, a confining abutment formed on the inner edge of one of said jaws and adapted to be engaged by said caging pin during precession of the gyro to prevent undue precession thereof during caging operations, spring means normally maintaining said jaws in their closed position, and means for rendering said spring means inoperative.

6. In a gyroscope, a gyro rotor, a member rotatably supporting said rotor for swinging movement about at least two axes other than the rotational axis of the rotor, a caging pin on said member, a pair of caging jaws in the form of arcuate bows partially encompassing said rotor and being pivoted for swinging movement at their opposite ends substantially about one of said axes, said jaws being movable from an open position to a closed position wherein they engage said caging pin therebetween to maintain the same in a predetermined fixed position with respect to the other of said axes, a second pair of caging jaws in the form of arcuate bows likewise partially encompassing said rotor and being pivoted at their ends for swinging movement substantially about said last mentioned axis and movable from an open position to a closed position wherein they engage the caging pin therebetween to maintain the same in a predetermined fixed position relative to said first mentioned axis, means carried in the medial regions of each jaw of one pair thereof and slidingly engaging the jaws of the other pair thereof whereby movement of the former pair of jaws from its open to its closed position and vice versa will cause corresponding similar movement of said latter pair of jaws, spring means normally maintaining one of said pairs of jaws in its closed position, and means for moving said last mentioned pair of jaws to its open position against the action of said spring means.

7. In a gyroscope, a gyro rotor, a member rotatably supporting said rotor for swinging movement about at least two axes other than the rotational axis of the rotor, a caging pin on said member, a pair of caging jaws in the form of arcuate bows partially encompassing said rotor and being pivoted for swinging movement at their opposite ends substantially about one of said axes, said jaws being movable from an open position to a closed position wherein they engage said caging pin therebetween to maintain the same in a predetermined fixed position with respect to the other of said axes, a second pair of caging jaws in the form of arcuate bows likewise partially encompassing said rotor and being pivoted at their ends for swinging movement substantially about said last mentioned axis and movable from an open position to a closed position wherein they engage the caging pin therebetween to maintain the same in a predetermined fixed position relative to said first mentioned axis, a pair of guide pins mounted on each jaw of the first pair thereof and disposed on opposite sides of the medial point thereof, each jaw of said second pair thereof being formed with an elongated slot therein, each of said pins extending into a respective slot whereby movement of the first pair of jaws from its open to its closed position and vice versa will cause corresponding similar movement of said second pair of jaws, spring means normally maintaining one of said pairs of jaws in its closed position, and means for moving said last mentioned pair of jaws to its open position.

8. In a gyroscope, a source of electric current, a gyro rotor, an electric motor for spinning said rotor, an electrical circuit for said motor leading from said source, means rotatably supporting said motor and rotor for swinging movement about at least two axes other than the rotational axis of the motor, caging means normally operative to bring the axis of said rotor to a predetermined fixed position, an electromagnet (76) operable upon application of a predetermined amount of current thereto to render said caging means ineffective, a main circuit (a, b, c, RI, d, e, 76, f) for said electromagnet leading from said source, a holding resistance (RI) in said main circuit, a branch circuit (a, R2, g, h, 78, i, e, 76, f) for said electromagnet leading from said source, a heating resistance (R2) in said branch circuit, the combined ohmic values of said resistances (RI, R2) being sufficiently high to prevent application of said predetermined amount of current to said electromagnet when current from the source is applied to said main and branch circuits, a pair of normally closed contacts (78) in said branch circuit, means operable upon application of said predetermined amount of current to said electromagnet for opening said contacts, a normally open auxiliary circuit (a, b, 80, k, h, 78, 76, f) leading from said source and including said normally closed contacts and electromagnet, a pair of normally open thermostatically controlled contacts (80) in said auxiliary circuit, said latter contacts being positioned in close proximity to said heating resistance and being adapted to become closed under the influence of heat generated by the latter, the ohmic value of said holding resistance (RI) being sufficient in itself to maintain said electromagnet energized after initial energization thereof due to the application of said predetermined amount of current thereto when current from said source is applied to said auxiliary circuit, and a switch disposed in and common to all of said circuits for connecting the latter to said source.

WARD LEATHERS.
GEORGE S. DI MONICO.

REFERENCES CITED

The following references are of record in the file of this patent:

UNITED STATES PATENTS

| Number | Name | Date |
|---|---|---|
| 1,788,807 | Sperry | Jan. 13, 1931 |
| 1,955,746 | Inglis | Apr. 24, 1934 |
| 2,393,124 | Smith | Jan. 15, 1946 |
| 2,406,698 | Long | Aug. 27, 1946 |